(12) United States Patent
Betty et al.

(10) Patent No.: US 6,922,470 B2
(45) Date of Patent: Jul. 26, 2005

(54) HYBRID DC-FEED CONTROLLER FOR A SUBSCRIBER LINE INTERFACE CIRCUIT

(75) Inventors: Christopher L. Betty, Arlington, TX (US); Donald C. Richardson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 597 days.

(21) Appl. No.: 10/167,913

(22) Filed: Jun. 12, 2002

(65) Prior Publication Data

US 2003/0231760 A1 Dec. 18, 2003

(51) Int. Cl.⁷ .............................................. H04M 9/08
(52) U.S. Cl. ...................... 379/413; 379/322; 379/323; 379/324
(58) Field of Search ................................ 379/413, 322, 379/323, 324

(56) References Cited

U.S. PATENT DOCUMENTS 6,671,373 B1 * 12/2003 Pang et al. ................. 379/413

\* cited by examiner

Primary Examiner—Jefferey Harold
(74) Attorney, Agent, or Firm—J. Dennis Moore; W. James Brady III; Frederick J. Telecky Jr.

(57) ABSTRACT

A method and apparatus in a DC-feed controller for controlling a subscriber line interface circuit controlling voltage (alternately, current) on a telephone line comprising a pair of wires. A digital feedback signal is subtracted from a predetermined voltage (alternately, current) limit digital value to provide a digital error signal that represents the difference between the voltage (alternately, current) limit digital value and the digital feedback signal. The digital error signal is multiplied by a predetermined digital gain value to provide a scaled digital error value. The scaled digital error value is integrated over time to generate an integrated digital error signal having a first predetermined number n of significant bits. A modified digital error signal is received, comprising a second predetermined number m of bits, where m<n, of the integrated digital error signal as an input and an output an analog error signal is provided that is representative of the modified digital error signal and that comprises the control voltage. A sense signal is received, the sense signal representing a sensed voltage (alternately, current) on the telephone line, and is converted to a digital sense signal that is a representation of the sense signal. Finally, the digital sense signal is digitally low pass filtered to provide the digital feedback signal.

45 Claims, 5 Drawing Sheets

HYBRID DC-FEED CONTROLLER FOR A SUBSCRIBER LINE INTERFACE CIRCUIT

TECHNICAL FIELD OF THE INVENTION

This invention relates to telephone line interface circuits, and more particularly relates to current and voltage control in DC-feed control loops.

BACKGROUND OF THE INVENTION

The Plain Old Telephone System ("POTS") consists of a network of local concentrations of telephone equipment, known as Central Offices ("CO"), which connect to surrounding subscribers. A subscriber's telephone is usually connected to the CO by way of two copper wires, which are referred to as the tip lead and the ring lead, in a familiar configuration commonly known as a twisted pair. FIG. 1 shows a high-level block diagram of a CO 10 and a subscriber 20.

The two-wire interface at the CO is a high voltage interface and requires high voltage circuits to drive it. Circuitry in a modem day CO 10, such as shown in FIG. 1, typically includes a software driven micro-controller 12, or, alternatively, an ASIC, interfaced with a computer 11, a low-voltage mixed-signal Integrated Circuit ("IC") 13, and a high-voltage Subscriber Line Interface Circuit ("SLIC") 14 connected to a twisted pair 15. The SLIC 14 is provided to feed power to a telephone 21 at the subscriber 20, transmit voice band frequencies, and detect subscriber signaling.

The connection between the CO and the subscriber is analog, and the signaling mechanism from the subscriber to the CO is the change in resistance of the telephone as it transitions between the on-hook and off-hook states. There is a large difference between the telephone's on-hook DC-resistance and its off-hook DC-resistance and, depending on whether the CO uses a voltage-feed SLIC or a current-feed SLIC, some voltage or current limiting may be required in order to protect equipment or maintain safe operation.

A DC-feed control loop is typically employed in SLICs. The purpose of the DC-feed control loop is to regulate the tip-to-ring current and voltage for all possible line conditions. In early prior art implementations, the DC-feed control circuitry was included on the high-voltage SLIC. The circuitry was entirely analog, there was no software programmability, and any change to the operating parameters usually required changing resistors and/or capacitors. Furthermore, the inclusion of control circuitry on the high-voltage part was expensive.

Consequently, newer designs of DC-feed control have transferred control circuitry from the high-voltage part to the low-voltage part and added software programmability. However, control loops remain analog and programmability is accomplished using digital-to-analog converters ("DACs") to set analog parameters. Thus, each programmable feature requires an additional DAC, adding integrated circuit chip area and power consumption with each such additional DAC. Furthermore, analog implementations usually require more than one amplifier, and they therefore consume a large amount of power and area, and generate considerable noise. Low Idle Channel Noise is a stringent requirement imposed on DC-feed circuits, and the noise contributed by analog implementations of DC-feed control is usually dominated by low-frequency 1/f noise, again, contributed primarily by the amplifiers.

SUMMARY OF THE INVENTION

An object of the present invention is to provide a hybrid, i.e. analog and digital, DC-feed control loop to put more functionality into the digital domain and to therefore reduce overall chip area and power. Another object of the present invention is to increase programmability of a DC-feed control loop. Another object is to limit the number of amplifiers in the transmit path of a DC-feed control loop and thereby reduce the low-frequency noise associated with the DC-feed path. A further object of the present invention is to provide a hybrid architecture for a DC-feed loop that is more versatile than prior art arrangements, and can be programmed to work with: 1) either current-feed SLICs or voltage-feed SLICs, 2) either SLICs which have a single input for tip/ring control or SLICs which have separate inputs for tip control and ring control, 3) either SLICs which output a sense of the TIP-to-RING voltage or SLICs which output a sense of the TIP voltage and a sense of the RING voltage, and 4) either SLICs which output a sense of the TIP-to-RING current or SLICs which output a sense of the TIP current and a sense of the RING current. A still further object of the present invention is to provide a hybrid architecture for a DC-feed loop that can be programmed, in arrangements where the SLIC has separate TIP and RING control inputs, to control the TIP and RING voltage either symmetrically or asymmetrically.

In accordance with the present invention there is provided a method and apparatus in a DC-feed controller for controlling a subscriber line interface circuit controlling voltage (alternately, current) on a telephone line comprising a pair of wires. A digital feedback signal is subtracted from a predetermined voltage (alternately, current) limit digital value to provide a digital error signal that represents the difference between the voltage (alternately, current) limit digital value and the digital feedback signal. The digital error signal is multiplied by a predetermined digital gain value to provide a scaled digital error value. The scaled digital error value is integrated over time to generate an integrated digital error signal having a first predetermined number n of significant bits. A modified digital error signal is received, comprising a second predetermined number m of bits, where m<n, of the integrated digital error signal as an input and an output an error analog signal is provided that is representative of the modified digital error signal. A sense signal is received, the sense signal representing a sensed voltage (alternately, current) on the telephone line, and is converted to a digital sense signal that is a representation of the sense signal. Finally, the digital sense signal is digitally low pass filtered to provide the digital feedback signal as an output.

These and other features of the invention will be apparent to those skilled in the art from the following detailed description of the invention, taken together with the accompanying drawings.

DETAILED DESCRIPTION OF THE PREFERRED EMBODIMENT

Figure 1:
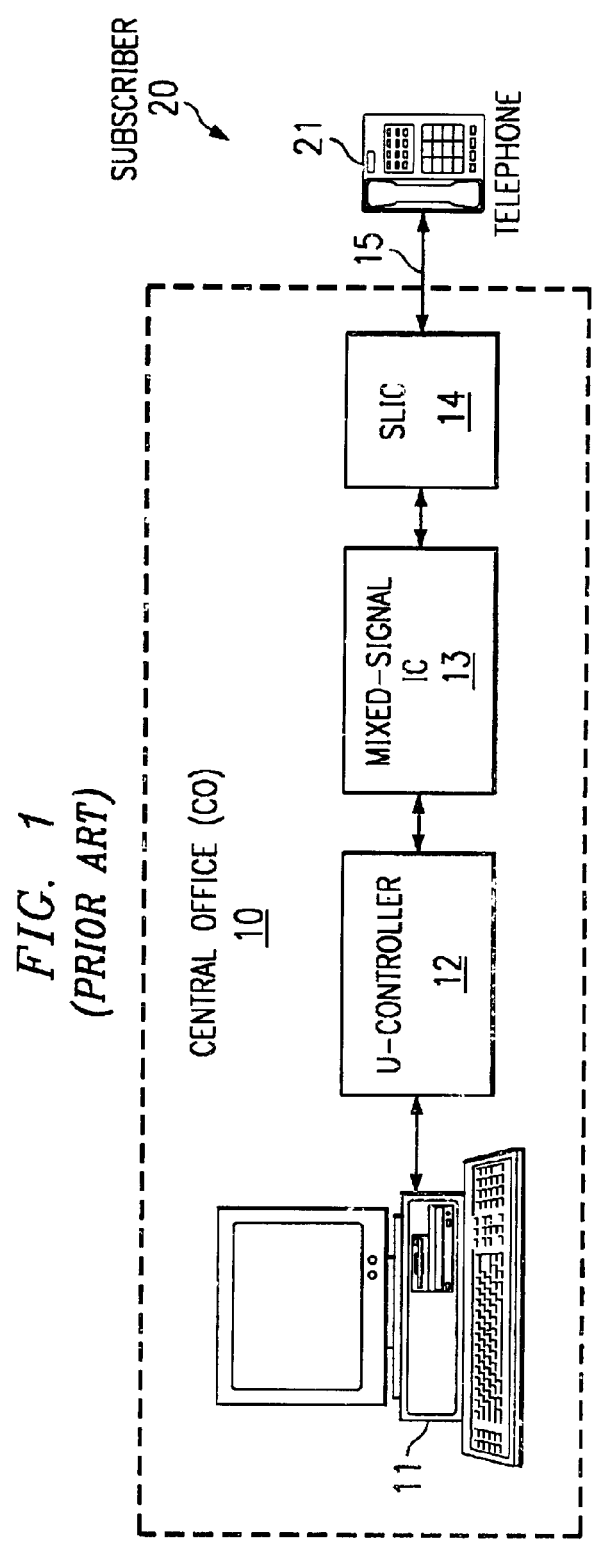
FIG. 1 is a high level block diagram of a CO in a POTS system.

The numerous innovative teachings of the present invention will be described with particular reference to the presently preferred exemplary embodiments. However, it should be understood that these embodiments provide only a few examples of the many advantageous uses and innovative teachings herein. In general, statements made in the specification of the present application do not necessarily delimit the invention, as set forth in different aspects in the various claims appended hereto. Moreover, some statements may apply to some inventive aspects, but not to others.

The general principles of operation of inventive SLIC DC-feed control loop embodiments described herein will now be described, followed by a detailed description of specific embodiments and their principles of operation.

The inventive SLIC DC-feed control loop implementations described herein are provided in two modes, a current-feed mode and a voltage-feed mode, depending on the feed type of SLIC. For current-feed SLICs, the purpose of the DC-feed control loop is to limit the tip-to-ring voltage, Vtr, for large tip-to-ring resistances, Rtr. For voltage-feed SLICs, the purpose of the DC-feed control loop is to limit the tip-to-ring current, Itr, for small tip-to-ring resistances. Thus, current-feed systems use a sense of the tip-to-ring voltage as feedback to limit the loop voltage, while voltage-feed systems use a sense of the tip-to-ring current as feedback to limit the loop current. Both voltage limiting and current limiting occur when the control system is in a closed-loop mode. When there is no need for limiting, then the system operates in an open-loop mode. Thus, the DC-feed loop also controls the switching between open-loop and closed-loop modes.

The DC component of Rtr is comprised of the line resistance, phone resistance, protection resistance and any other resistance seen by the twisted pair. When a telephone is on-hook, i.e., hung-up, the DC component of Rtr is dominated by the resistance of the telephone ringer circuit, which is commonly referred to as the REN load. The REN load, which is ac-coupled, theoretically has infinite DC-resistance, but actually has some DC-leakage resistance, typically >50 kΩ. When the phone is off-hook, its DC resistance is dominated by the voice band load, and this resistance typically varies between 80 Ω and 400 Ω. Additionally, line resistance and protection resistors can add several hundred ohms making the total off-hook resistance vary from 80 Ω to 2000 Ω.

In current-feed SLIC mode, Vtr is equal to Itr*Rtr, and typical desired line currents (Itr) range from 15 mA to 50 mA. Whenever Itr*Rtr is greater than a specified maximum Vtr, then the inventive DC-feed control loop limits this voltage to an acceptable level. This maximum level is determined either by the battery voltage used by the system, or by the system requirement that Vtr not exceed a specified voltage, for example, 56 V. Thus, the DC-feed control loop limits Vtr when the phone is on-hook, and also when the phone is off-hook but presents a large Rtr to the line. When the DC loop resistance is small, which occurs in off-hook, short loop conditions, the DC-feed control loop usually operates in open-loop, i.e., constant-current, mode. This means that the control circuitry simply supplies a constant voltage to the off-chip resistor, which means it supplies a constant-current into the SLIC; therefore, a constant current is provided out of the SLIC. During constant-current operation the feedback signal has no influence on the controller's output voltage.

In voltage-feed SLIC mode, Itr is equal to Vtr/Rtr, where a typical on-hook Vtr is 50 V and a typical off-hook Vtr is 16 V. Whenever Itr is greater than a specified maximum limit, which is typically 15 mA to 50 mA, then the DC-feed control loop takes control, enters closed-loop mode and limits Itr to the desired level. In general, the system is in the closed-loop mode when the phone is off-hook and in the open-loop mode when the phone is on-hook. However, there are cases where, for large off-hook resistances, the system operates in the open-loop mode.

Typical phone systems utilize two different batteries for DC-feed operation, namely, high battery and low battery. The high battery is usually used for on-hook operation where a high Vtr is required, e.g., 43.75 V–56 V, but little current flows, and the low battery is usually used during off-hook operation. Battery transitions are typically software initiated, occur only after valid transition states have been detected, and create transients that impact DC-feed operation.

A detailed description of a current-feed mode SLIC embodiment of the present invention will now be described, followed by a detailed description of a voltage-feed mode SLIC embodiment of the present invention.

Figure 2A:
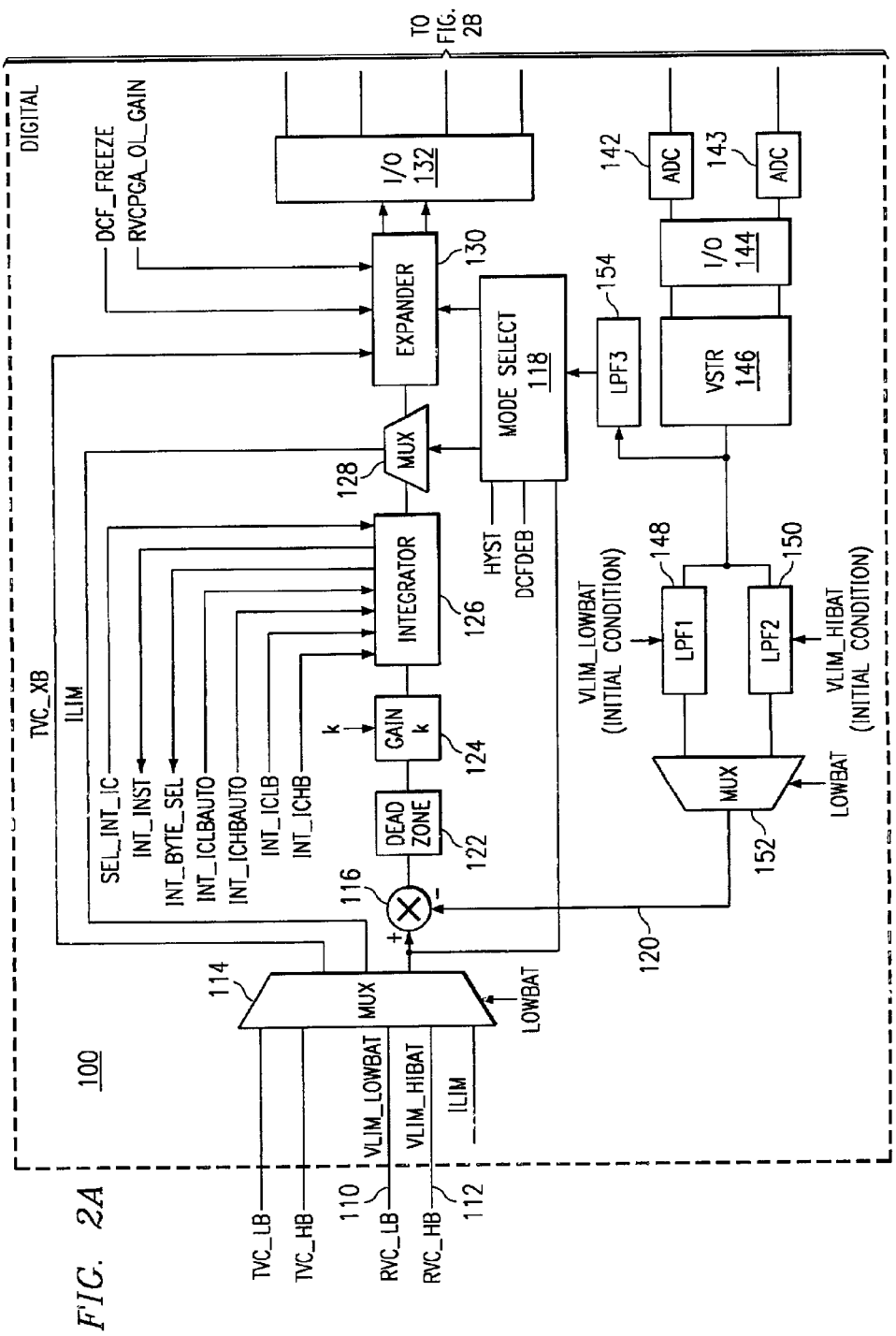
FIG. 2 is a block diagram of a preferred embodiment of the present invention, in a current-feed mode.
Figure 2B:
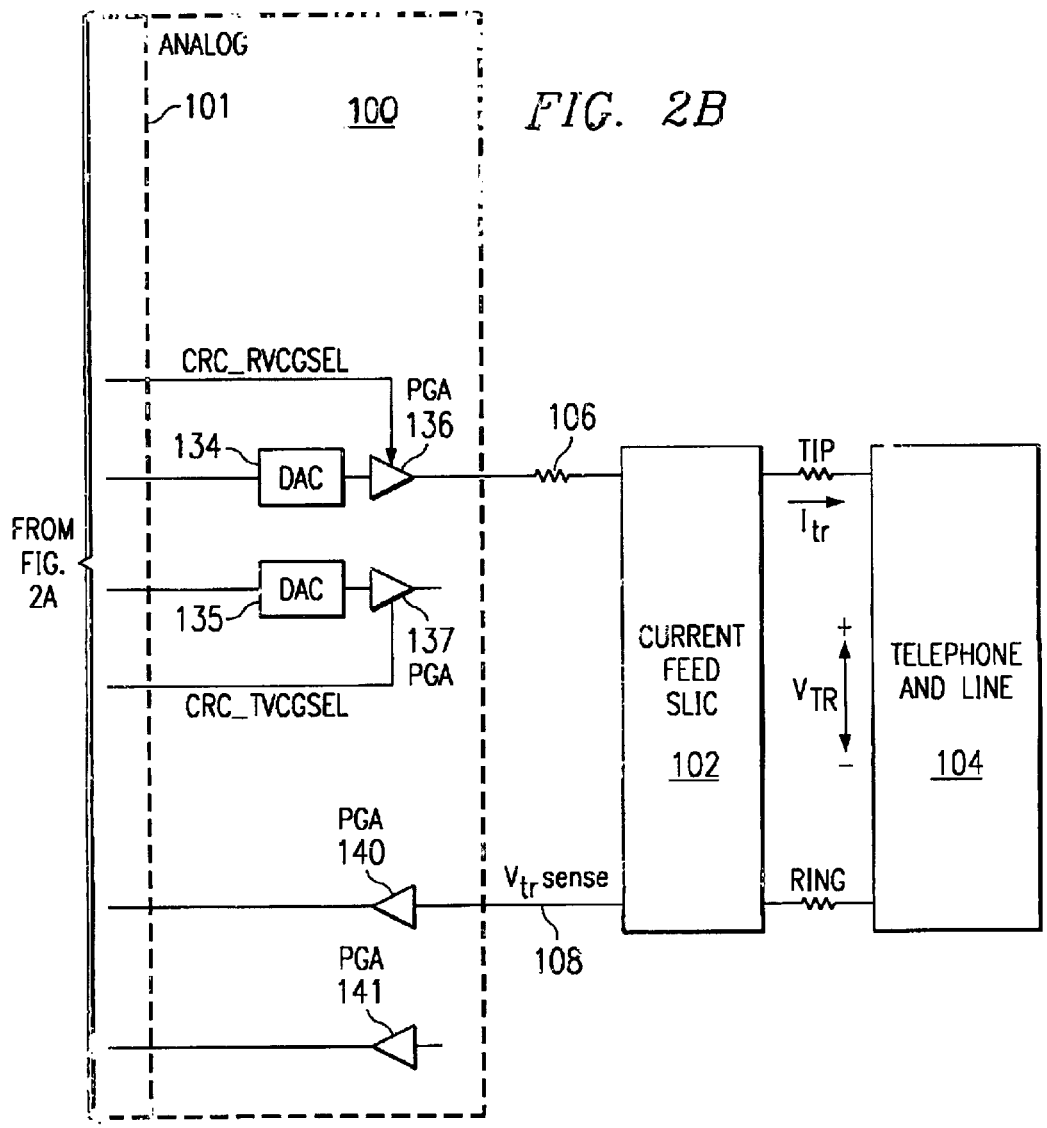

A block diagram of a DC-feed control loop for a current-feed mode SLIC is shown in FIG. 2. The controlling section of the DC-feed control loop is a controller 100. Controller 100 includes an analog section and a digital section, which are shown in the figure separated by a dashed line 101. The controller 100 may be embodied in a single mixed-signal IC. Alternatively, for optimization of IC fabrication processes for particular circuit types, controller 100 may be implemented with the analog section in an analog IC and the digital section in a digital IC, with both ICs included in a single multi-chip module, for example. The digital section can be implemented entirely in hardware, entirely in software, or partially in hardware and partially in software, all as desired by the designer.

Controller 100 operates in both open-loop and closed-loop modes, and for both of those modes, in high battery and low battery conditions. The battery conditions are programmable, and indicated to the controller 100 by a control signal, LOWBAT, provided by the external system (not shown) to various components, as described in detail below. When high, the signal LOWBAT indicates a low battery condition, while when low it indicates a high battery condition.

The total control loop encompasses the controller 100, a conventional current-feed SLIC 102, and a conventional telephone and telephone line, shown as a single block 104 in the figure. The controller 100 output feeds the SLIC 102 through an external resistor 106, and a sense, $V_{tr}$ sense, of the tip-to-ring voltage, $V_{tr}$, is fed back to the controller 100 from the SLIC on line 108. The analog voltage $V_{tr}$ sense is digitized, and the digital signal VSTR is the feedback signal used to control the DC-feed. The SLIC drives the telephone through the line. It will be readily understood to those of ordinary skill in this art area that as used herein the term digital signal means a series of digital values corresponding to a sequence of samples of an analog signal.

VLIM is the specified voltage limit at which it is desired to have the system begin to limit voltage for a current-feed SLIC, and it is provided as an input to controller 100. VLIM can have either of two digital values, VLIM_LOWBAT or VLIM_HIBAT, depending on whether the system is operating in the low-battery or high-battery mode, respectively. These two values of VLIM are provided on lines 110 and 112, respectively, to a first multiplexer ("MUX") 114. MUX 114 selects the correct VLIM value, controlled by the control signal LOWBAT.

Note that MUX 114 has five signal inputs, namely, TVC_LB, TVC_HB, RVC_LB, RVC_HB and ILIM, and one control input, namely, LOWBAT. The signal inputs TVC_LB and TVC_HB provide the specified voltage limit for the tip line at low voltage and high voltage conditions, respectively. The signal inputs RVC_LB and RVC_HB provide the specified voltage limit for the ring line at low voltage and high voltage conditions, respectively. The signal input ILIM provides the specified current for open-loop mode. The controller may be implemented in a manner such that it may be used with either a current-feed SLIC or a voltage-feed SLIC, as desired, by programming it for one or the other. A voltage-feed SLIC controller is explained in detail below. The controller 100 in FIG. 2 is shown with common elements for both type SLICs. In the current-feed controller 100, only the current in the ring line is controlled, and so the signal inputs TVC_LB and TVC_HB are ignored. For clarity, in the description of the current-feed SLIC controller 100, RVC_LB is referred to as VLIM_LOWBAT, and RVC_HB is referred to as VLIM_HIBAT, being referred to collectively simply as VLIM.

The selected VLIM value is provided to a summer 116 and to a mode select block 118. The selected VLIM value is summed in summer 116 with a digital feedback signal on line 120, having a negative sign, to produce a difference digital error signal (since the feedback signal has a negative sign, the summer effectively subtracts the feedback signal from the selected VLIM value), which is provided to a dead-zone block 122, which prevents the error signal from toggling between bits by determining if the absolute value is less than some predetermined number, and then holding the output to a zero value if that condition is true. Preferably, the dead-zone block 122 holds the output to a zero value if all bits other than the least significant bit ("LSB") are zero, or, alternatively, if all bits other than some selected number of LSBs are zero, which selected number can be one, or some other number, as desired by the designer.

The output of the dead-zone block 122 is provided to a digital multiplier 124. The error signal is multiplied in multiplier 124 by a gain factor of k, which is selected in accordance with principles set forth below. The error signal thus scaled, or "amplified," is provided to a 22-bit integrator 126. The integrator 126 by conventional methods digitally integrates the digital signal provided to its input. The integrator 126 also increases the digital resolution of the control loop by a selected amount without requiring an increase in the resolution of the converters. This provides the control system the signal integration and the necessary resolution for stability. The resolution selected in the preferred embodiment described herein is twenty-two bits, while the closed-loop output levels are programmable at only 8 bits. This is described in more detail below.

The thus-modified output of integrator 126, is provided to one input of a second MUX 128, with the programmed value of the desired current limit, ILIM, being provided to a second input. MUX 128 is controlled by the mode select block 118, in a manner described in detail below. In closed loop mode, the output of integrator 126 is selected by MUX 128 and passed to a non-linear expander 130. In open-loop mode, ILIM is selected by MUX 128 and is passed without modification to an 8-bit digital-to-analog converter ("DAC") 134, where an analog voltage is generated and provided to the input of a first programmable gain amplifier ("PGA") 136, which provides the amplified analog voltage to resistor 106 so as to produce a resultant current into the SLIC 102. It will be recalled that controller 100 controls only the RING line. DAC 135 and PGA 137 are provided for control of the TIP line, and so are not used in the current-feed controller 100. Their use is described in detail below, in conjunction with the description of a voltage-feed control embodiment of the present invention.

The gain of PGA 136 is register programmable according to principles described below. In the open-loop mode the tip-to-ring current, $I_{tr}$, is given by:

$$I_{tr} = \frac{ILIM \, G_{DAC} \, G_{DACPGA} \, K}{R_{ext}}, \quad \text{Eq. (1)}$$

where:
ILIM is the register programmable current limit,
$G_{DAC}$ is the gain of DAC 134,
$G_{DACPGA}$ is the gain of PGA 136,
K is the current gain of the SLIC 102, and
$R_{ext}$ is the resistance value of resistor 106.

As mentioned above, the output of MUX 128 is provided to non-linear expander 130. The non-linear expander 130 is used in closed loop mode to compensate for variations in line resistance by dynamically adjusting the output of MUX 128, and compensating for this adjustment by changing the gain of PGA 136 by way of a control signal C2C_RVCGSEL, in a manner described in detail below. The signal output of expander 130 is provided to DAC 134. Expander 130 also has as inputs the lines carrying signal RCVPGA_OL_GAIN and control input DCF_FREEZE. The signal RCVPGA_OL_GAIN is the programmable value for the control signal used to control PGA 136 in open-loop mode. When the control input DCF_FREEZE is active, the output of Expander 130 is held to whatever the value was at the time DCF_FREEZE was asserted. The signal TVC_XB is not used in controlling current-feed SLICs.

Both the line carrying control signal C2C_RVCGSEL and the line carrying the signal output of expander 130 are provided to a first I/O block 132, which buffers the two signal lines. The buffered signal output of expander 130 is provided to the input of DAC 134, while the buffered control signal C2C_RVCGSEL is provided to the control input of PGA 136. 10 block 132 may not be necessary in a single mixed signal chip implementation, since its function, as mentioned above, is simply to buffer the two signal lines.

The output of DAC 134 is an analog voltage that is provided to the input of PGA 136. The output of PGA 136 is provided to the SLIC 102 through resistor 106, and the current entering the SLIC 102 through this resistor 106 is amplified in the SLIC 102 and output to the telephone. The tip-to-ring voltage $V_{tr}$ across the tip-to-ring resistance $R_{tr}$ resulting from the current $I_{tr}$ sourced by the SLIC 102 is sensed by the SLIC 102 and used to generate a low-voltage sense signal, $V_{tr}$ sense, corresponding to the sensed tip-to-ring voltage. The sense signal $V_{tr}$ sense is provided on line 108 to a third PGA 140 in the controller 100. The level of the feedback signal $V_{tr}$ sense is adjusted by PGA 140 in accordance with principles discussed below, and then digitized by an analog-to-digital converter ("ADC") 142 to generate the digital feedback signal VSTR. The third PGA 140 is only optionally programmable for convenience and flexibility, as its gain is not typically changed in a given application. Typically, however, an amplifier is needed at this place in the controller in order to appropriately scale the feedback signal, as described below. Further, it will be recalled that the controller 100 in FIG. 2 is shown with common elements for both current-feed and voltage-feed SLICs. A fourth PGA 141 and second ADC 143, shown in FIG. 2, are not used in the current-feed control mode controller and are described in detail below.

The signal VSTR is optionally buffered in a second I/O block 144, and is provided with the correct sign for the operation in summer 116 and stored in a register 146, which is provided for timing coordination. The signal VSTR stored in register 146 is low-pass filtered in low pass filter ("LPF") 148 for low battery mode operation, and in LPF 150 for high battery mode operation, to provide the digital error signal on line 120. It is also low pass filtered in LPF 154 and provided to mode select block 118 to control mode switching (i.e., closed-loop or open-loop mode), as described below in connection with the detailed description of the mode select block 118. A third multiplexer 152 selects the output of LPF 148 or of LPF 150 under control of the same LOWBAT control signal mentioned above in connection with MUX 114.

The closed-loop transfer function of controller 100 is given by $$\frac{G}{1+GH}$$

where, $$G = \frac{kG_{DAC}G_{DACPGA}K R_{LINE}}{sR_{ext}}, \text{ and} \quad \text{Eq. (2)}$$

$$H = \beta G_{ADCPGA} G_{ADC} G_{LPF}, \quad (3)$$

where:
G is the forward-loop transfer function,
H is the feedback loop transfer function,
k is the gain factor of multiplier 124,
$G_{DAC}$ is the gain of DAC 134,
$G_{ADC}$ is the gain of ADC 142,
$G_{LPF}$ is the gain of LPF 148 (alternatively, 150),
$G_{DACPGA}$ is the gain of PGA 136,
β is the voltage gain (VSTR/Vtr) of the metallic voltage sense of SLIC 102,
$G_{ADCPGA}$ is the gain of PGA 140,
K is the current gain of the SLIC 102,
$R_{LINE}$ is the line resistance, and
$R_{ext}$ is the resistance value of resistor 106.

Advantageously, in the preferred embodiments of the present invention control loop response time is improved through the use of initial conditions for the integrator 126 and for the feedback filters 148, 150. If the line resistance is known prior to switching into closed-loop operation, then the steady state integrator output can be calculated and used as the initial condition for the integrator 126. However, this is typically not the case. Nonetheless, although the line resistance is typically not exactly known, sometimes it can be closely estimated and therefore, response times can be significantly reduced by using the estimation to calculate the initial condition, and using the calculated initial condition as the starting value in the integrator 126. Using this initial condition as a starting value in a first use on a given line, the integrator 126 eventually settles with the correct value. Preferably, this steady-state value is then saved and used the next time as the initial condition. Thus, if line conditions remain constant then the response time for settling associated with the integrator 126 is minimal. Also, separate initial conditions are used and saved depending on the battery selection, i.e., either hi-battery or low-battery. These initial conditions are represented in FIG. 2 as alternate inputs INT_ICHB, INT_ICLB, INT_ICHBAUTO and INT_ICLBAUTO, representing, respectively, a default, standardized initial condition for high battery mode, a default, standardized initial condition for low battery mode, a saved initial condition (from a previous use) for high battery mode and a saved initial condition for low battery mode. The default, standardized initial conditions can be arbitrary values, such as mid-range values, or pre-estimates, as desired by the designer.

Also shown as an input to integrator 126 is a control signal SEL_INT_IC, which is used to select among the starting values described above. The instantaneous, i.e., present clock cycle, value in integrator 126 can be read out and provided to the external system on an eight bit wide line INT_INST. Since the value to be thus read-out is twenty two bits wide, a byte select control input is provided on input line INT_BYTE_SEL.

As mentioned above, a function of the expander 130 is to dynamically adjust the PGA 136 gain in order to compensate for variations in line resistance. As mentioned previously, the line resistance, $R_{LINE}$, is typically unknown, can vary over a wide range, e.g., 80 Ω to 50 kΩ, and can directly effect the forward-loop transfer function of the control system, as shown in Equation (2). Line resistance variations affect the control system's stability and response time, by altering the forward-loop gain, and by imposing unacceptable DAC resolution requirements.

The stability of a closed-loop control system gets worse as the forward-loop gain increases, while the response time gets better as the forward-loop gain increases. If the forward-loop gain remains constant, then a well-designed control-loop can be both stable and achieve acceptable response time. However, for the DC-feed control loop, it can be seen from Equation (2) that the forward-loop gain is directly proportional to $R_{LINE}$. Since the $R_{LINE}$ variation can be so great, e.g., 200X, it is difficult to achieve both stability and fast response times over all possible line resistances given that all other parameters in Equation (2) remain constant. For example, if k, K, $G_{DAC}$, $R_{ext}$, and $G_{DACPGA}$ were selected such that the closed-loop system were stable for $R_{LINE}$=100 kΩ, then the response time when $R_{LINE}$=2 kΩ would be unacceptably slow, since the forward loop gain would decrease by a factor of 50. Conversely, if k, K, $G_{DAC}$, $R_{ext}$, and $G_{DACPGA}$ were selected for acceptable response time when $R_{LINE}$=2 kΩ, then the $R_{LINE}$=100 kΩ case would be unstable.

Thus, it will be appreciated that the expander 130 reduces the variation in forward loop gain as a function of $R_{LINE}$ by dynamically reducing the gain of PGA 136 as $R_{LINE}$ increases. In this embodiment, the expander 130 sets $G_{DACPGA}$ to 0.0291 for $R_{LINE}$=100 kΩ and $G_{DACPGA}$ to 0.933 for $R_{LINE}$=1 kΩ. Since the forward-loop gain is proportional to both $R_{LINE}$ and $G_{DACPGA}$, the forward-loop gain varies by a factor of three between the two cases rather than a factor of 100. Thus, both stability and response time requirements are simultaneously satisfied for all normal line resistances.

Another important function of expander 130 is that it artificially varies the resolution of DAC 134 by dynamically adjusting the digital code by subtracting a fixed value from the input code and compensating for this by changing $G_{DACPGA}$. The output voltage requirement, $V_{out}$, of the PGA 136 to achieve a specific VLIM is given by:

$$V_{out} = \frac{VLIM R_{ext}}{\kappa R_{LINE}}$$

In a typical on-hook condition, for example, K=500, $R_{ext}$=9.75 kΩ, $R_{LINE}$=100 kΩ, and VLIM=20 V, $V_{out}$ is equal to 3.9 mV. For a typical off-hook condition, for example, K=500, $R_{ext}$=9.75 kΩ, $R_{LINE}$=840 Ω, and VLIM=20 V, $V_{out}$ is equal to 464 mV. If the same gain for PGA 136 were used for both conditions and the resolution of DAC 136 were 8 bits, then $V_{out}$ for $R_{LINE}$=100 kΩ would correspond to 1 LSB (out of 128) and $V_{out}$ for $R_{LINE}$=840 Ω would correspond to 119 LSB (out of 128). However, it is not desirable to design a system, even if it is operating with no feedback, which has a known state that corresponds to 1 LSB. Furthermore, since such a system would have feedback, it is probable that the closed-loop response would be unstable and toggle between 0 and 1 LSB, thus producing an output that toggled between 0 V and 20 V. If $R_{LINE}$ increased to 200 kΩ, then the resolution of DAC 134 would have to be doubled to accommodate both extremes. Thus it can be seen that expander 130 advantageously dynamically adjusts the PGA gain so that, under any line condition, the digital portion of the feedback system has sufficient digital resolution to settle on the desired steady-state value.

Specifically, the transfer function in the preferred embodiment for expander 130 for the current-feed application is as follows:

for input≧0
if input≦31, output=input and $G_{PGA}$=0.0291
if 31<input≦63, output=input−16 and $G_{PGA}$=0.0582
if input>63, output=input−61 and $G_{PGA}$=0.933
for input<0
if |input|≦31, output=input and $G_{PGA}$=0.0291
if 31<|input|≦63, output=input+16 and $G_{PGA}$=0.0582
if |input|>63, output=input+61 and $G_{PGA}$=0.933

The above expander is a 3-stage expander where the first stage uses a PGA gain of 0.0291, the second stage uses a gain of 0.0582, and the third uses a gain of 0.933. The expander has two symmetric sides, one for positive numbers and one for negative numbers. The operation of this particular expander embodiment is based on the property that the PGA gains are related by a factor of 2. The second stage gain is twice as large as the first and the third stage gain is 32 times the first. The transition from the first stage to the second stage is continuous since 32*0.0291=(32−16)*0.0582. Similarly, from stage 2 to stage 3, (64−16)*0.0582=(64−61)*0.933. If the expander is not continuous, oscillations between modes may occur. Since response time and stability are directly proportional to the forward loop gain, expander 130 maintains stability for large $R_{LINE}$, and provides a reasonable response time when $R_{LINE}$ is small. It will be appreciated that specific values for transitions and for values of $G_{PGA}$ may be made different for different systems. However, practitioners of ordinary skill will readily make appropriate selection for a particular system, once the principles of the present invention as described herein are understood.

It should be noted that the typical line resistance does not vary continuously from 1 kΩ to 200 kΩ. When the phone is off-hook, typical resistances range from 80 Ω to 2000 Ω but, as mentioned above, when the phone is on-hook resistances are expected to be between 50 kΩ and 200 kΩ.

It was mentioned above that control loop response time is improved through the use of initial conditions for the integrator 126 and for the feedback filters 148, 150. The considerations involved in the use of initial conditions for the integrator 126 were discussed in detail above. Regarding the use of initial conditions for feedback filters 148, 150, these initial conditions are provided such that the initial response of feedback filters 148, 150, is substantially correct. Feedback filters 148, 150, are provided to remove unwanted voice-band content from the feedback signal but they adversely effect response time. However, the output of the feedback, once it settles, is known and should equal VLIM. There are two feedback filters, one for low-battery operation, filter 148, and one for high-battery operation, filter 150. During the time when the feedback filters are not being used, feedback filter 150 is initialized with VLIM_HIBAT and filter 148 is initialized with VLIM_LOWBAT. Therefore, when they go into operation, they begin at the correct value. Thus, the use of initial conditions for feedback filters 148, 150, minimizes response time.

The mode select block 118 uses a version of VSTR that has been filtered by a third low pass filter, LPF 154, to determine the mode, i.e., closed-loop or open-loop, of operation of the DC-feed loop. Mode select block 118 also receives as inputs two additional values, HYST and DCFDEB. The value HYST is a programmable voltage "hysteresis" which, when subtracted from VLIM, provides a threshold below which VSTR will not go under ordinary conditions as it traverses VLIM during settling after a mode switch, and, after settling, even with a typical noise spike. Once mode select block 118 has switched to closed-loop mode, it will not switch back to open-loop mode unless the signal from LPF 154 drops below this threshold. In other words, only when |VSTR|<|VLIM−HYST|, the DC-feed loop switches from closed-loop "constant voltage" operation to open-loop "constant current" operation. Selection of the specific value for HYST is a matter for the designer; a typical value is 10% of VLIM.

In addition, once in closed-loop mode the conditions for switching to open-loop mode must exist without interruption for an interval of time specified by DCFDEB. Selection of the specific value for DCFDEB is, again, a matter for the designer, and the time interval can vary widely, but a typical value is 20 milliseconds. The value of VSTR settles to VLIM exponentially, and so the designer will appreciate that the selection of DCFDEB can influence the selection of HYST. The programmable debounce and hysteresis functions prevent erroneous mode changes.

Figure 3A:
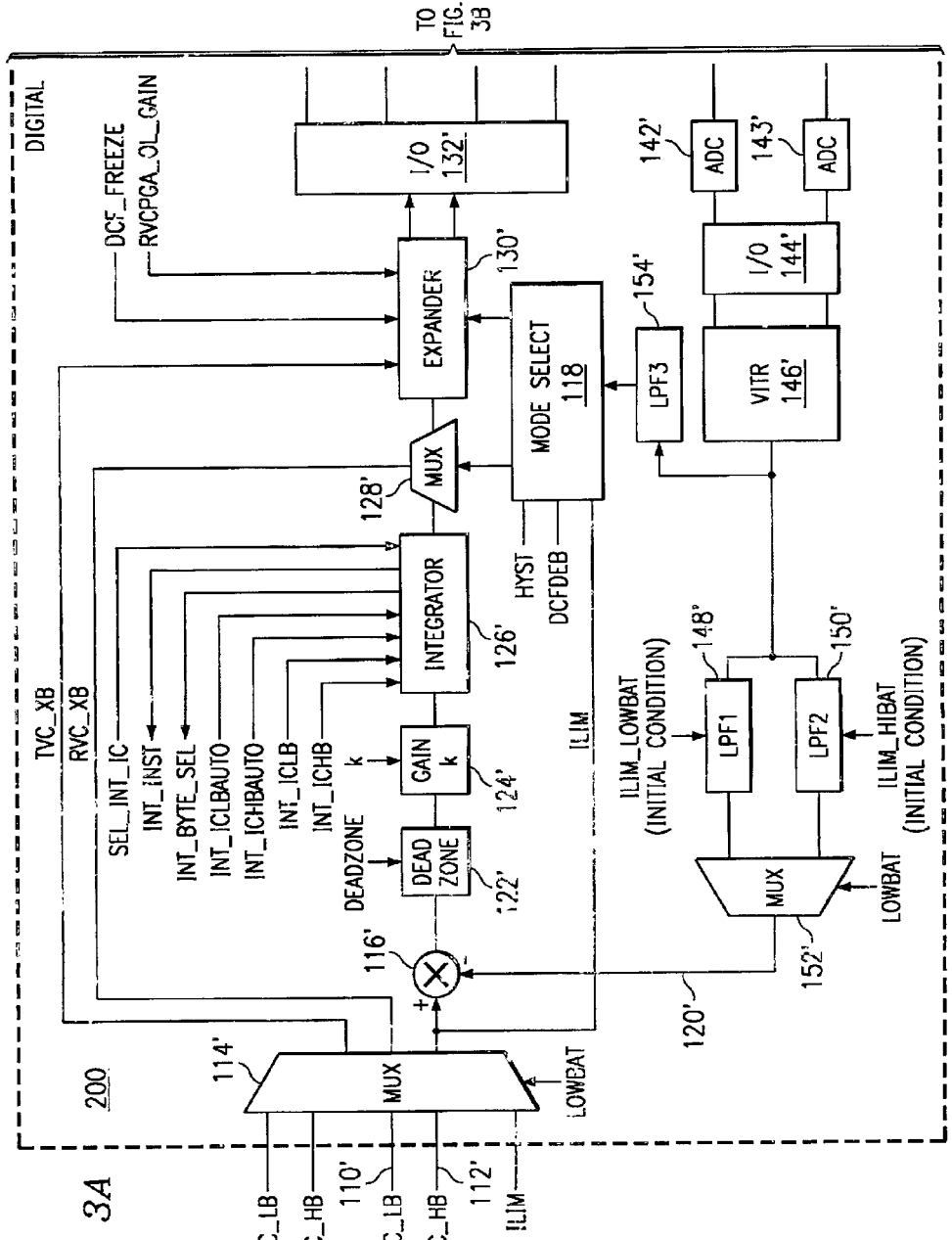
FIG. 3 is a block diagram of a preferred embodiment of the present invention, in a voltage-feed mode.
Figure 3B:
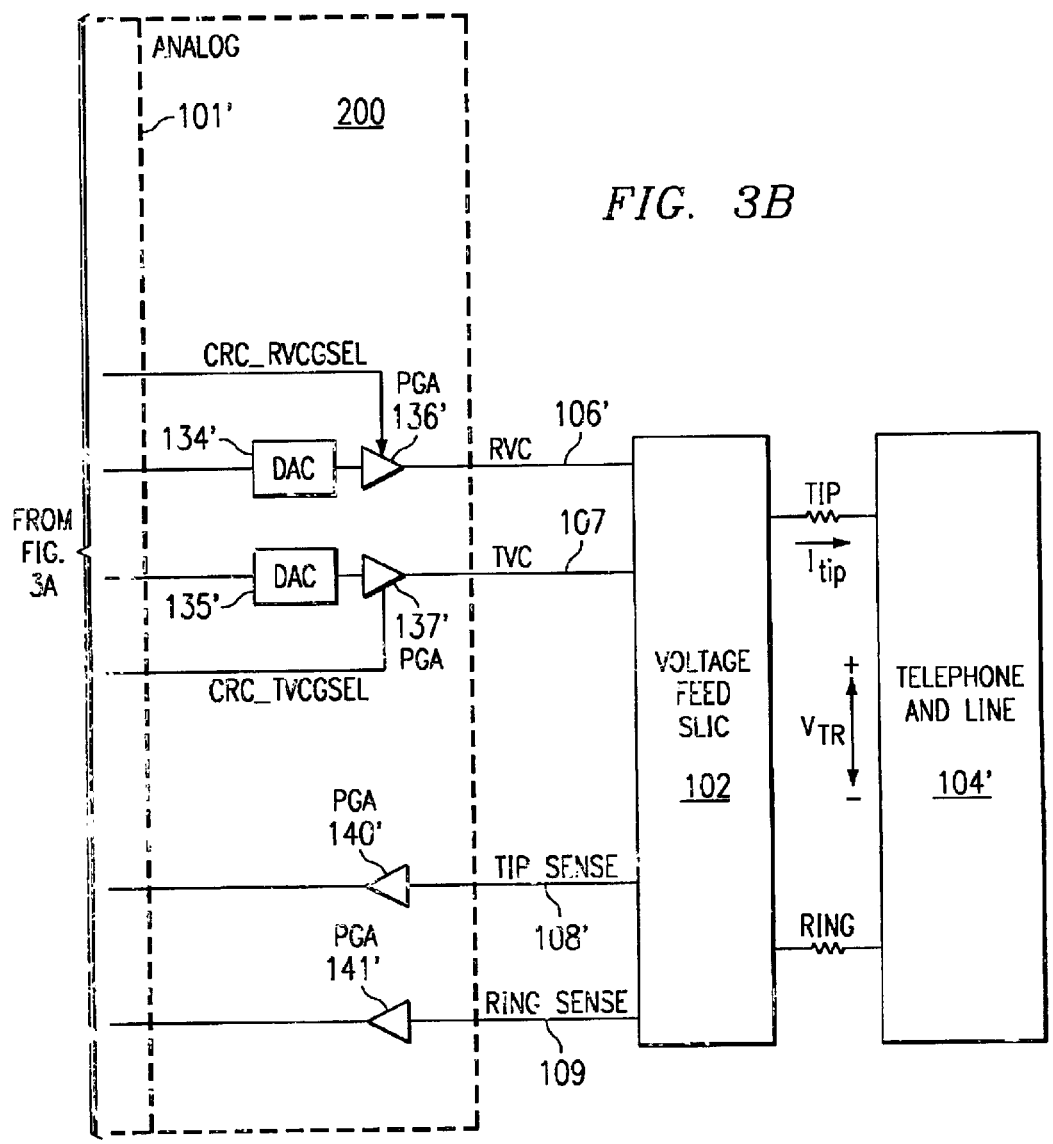

A block diagram of a DC-feed controller 200 for a voltage-feed SLIC application is shown in FIG. 3. The system is similar to that shown in FIG. 2 except that the input signal is a desired current limit, ILIM, instead of a voltage limit and the feedback signal is provided as two feedback signals, tip sense and ring sense, being representations of the tip current and ring current, respectively, on lines 108' and 109', respectively. Thus, feedback is provided for both the TIP and the RING lines. The digital values for tip sense and ring sense are averaged in VITR 146' to provide the feedback signal for controller 200.

Thus, with exceptions described herein, the principles of operation of controller 200 are similar to those of controller 100, and are not be described in detail, since they will be readily apparent to those of ordinary skill in this art area. In fact, a single IC can be made to provide an embodiment of the present invention, programmably controllable for use with a current-feed SLIC and, alternately, with a voltage-feed SLIC. One simply combines the functions of controller 100 and controller 200, with programmable selection of the respective functional blocks and values for the two cases.

In FIG. 3, lines, signals and functional blocks that correspond to identical or similar blocks in FIG. 2 are identified by the same reference numeral as that used in FIG. 2, but with a prime designation, such as 110' in FIG. 3 corresponding to 110 in FIG. 2. The differences between the two controllers will now be described.

As mentioned above, in some voltage-feed applications it is desirable to drive the TIP and RING voltages symmetrically around ground or some other voltage level. The controller 200 implementation allows this to be accomplished digitally, mirroring the digital input of the RING DAC 134' and a TIP DAC 135' around a programmable digital value. Determination of these values is done in the Expander 130'. PGA 136' provides the RING control signal RVC, under control of signal CRC_RVCGSEL, while PGA 137' provides the TIP control signal TVC, under control of signal CRC_TVCGSEL.

Thus, in voltage-feed applications where the TIP and RING voltages are both controlled, the option is provided to: 1) drive the TIP and RING voltages symmetrically about ground or some other programmable voltage or 2) set TIP (alternatively, RING) constant and vary RING (alternatively, TIP). The former is referred to as symmetric mode, while the latter is referred to as asymmetric mode.

Current feed SLICs generally have a single input since there is only one line current, which is equal to the TIP voltage minus the RING voltage divided by the line resistance. However, there is usually a longitudinal balance input on the SLIC that allows one to set the voltage about which TIP and RING vary to produce the line current. Since, the current-feed embodiment has two outputs, this arrangement can also be accommodated.

Further, because voltage is being driven, rather than current, no resistor 106 is provided at the output of PGA 136'. Instead, a direct connection is provided at 106' for the ring line control voltage RVC, as there is for the TIP line control voltage TVC, provided on line 107. In addition, in voltage-feed applications it is necessary to monitor the tip-to-ring current $I_{tr}$, which is the average of the current $I_t$ on the TIP line and the current $I_r$ on the RING line. For such circumstances, two PGAs 140' and 141' are provided at the feedback input, to receive a separate sense signal for $I_t$ and for $I_r$. The separate sense signals are separately converted into digital values, in ADCs 142' and 143', and passed though I/O block 144'. The two digital values are averaged and stored in VITR averaging/register block 146'.

Hybrid analog and digital control loop implementations for DC feed functions needed in a POTS system have been described herein, offering a high degree of programmability and performance and cost improvements over previous all analog or mostly analog implementations. Thus, as mentioned above, implementations in accordance with the present invention may be designed to operate with voltage-feed SLICs and with current-feed SLICs. Further, implementations in accordance with the present invention use only a single DAC per output signal and a single ADC per input signal in the feedback control loop, with other functions in the loop implemented digitally. Digital filters are provided that can be pre-conditioned with selected and/or automatically determined inputs to minimize settling time when they are switched into the feedback control loop. Requirements for ADC and DAC resolution are reduced by increasing the order of the feedback control loop with the inclusion of an integrator having a larger number of bits resolution than the ADC(s) and DAC.

Further, implementations in accordance with the present invention provide programmable digital gains in the feedback control loop and programmable initial conditions for storage elements. Implementations in accordance with the present invention have the ability to learn initial conditions of the feedback control loop based on prior settled conditions detected with a debounced version of the error signal. The use of a programmable debounce function for controlling the change from open-loop operation to closed-loop operation avoids unwanted mode changes. Inclusion of an expansion gain function in the forward control path increases the range of stable operation without re-programming. The use of a dead zone on the error signal prevents toggling of bits on the input of the DAC so as to eliminate quantization noise from the output when the loop is settled.

Hybrid DC-feed control loop implementations described herein work with both voltage-feed and current-feed SLICs, are stable for all possible line conditions while providing acceptable response time. In the process of inventing these implementations, the inventors overcame several shortfalls associated with digital feedback systems.

Firstly, digital feedback and control systems, as compared with their analog counterpart, have very limited resolution both in time and amplitude and both affect the stability and response time of the control loop. It is not practical to simply increase the converter's sampling rate and resolution. In general, system requirements dictate programmability on the order of six to eight bits with sampling rates of about 8 kHz. However, a stable $1^{st}$ order, digital control loop may require twenty bits of resolution and sampling rates in the tens or hundreds of kHz. Thus, in order to avoid excessive converter over-design, an alternative solution is required. Our inventive solution to this excessive resolution requirement is the addition of an integrator in the forward path. This integrator converts the $1^{st}$ order feedback system to a $2^{nd}$ order system and effectively boosts the resolution of the control loop, as far as stability is concerned, to that of the integrator while the closed-loop resolution remains at the lower, six to eight bit rate. The integrator used in this solution is twenty-two bits wide but its output is reduced to 8-bits, thus requiring 8-bit converters.

Secondly, the forward-loop gain of the feedback and control system is proportional to the DC-resistance seen by the SLIC and this resistance varies widely and is not known a-priori. For example, in the current-SLIC application the forward loop gain (G) is directly proportional to the line resistance encountered during closed-loop operation. This resistance may vary from 1000 Ω for a long-loop, off-hook condition to 200 kΩ for the on-hook condition. This corresponds to a 200× increase in the forward-loop gain. It is difficult to guarantee that the closed-loop system is stable for the 200 kΩ case and at the same time provides a reasonable response time for the 2000 Ω case. We accomplished this.

Lastly, the switching into and out of the feedback mode is also an important and delicate operation. Sudden changes in line resistance create transients and it is these transients, as seen through the feedback signal, that provide the information used to determine whether or not the control system should switch into or out of the feedback mode. Control loops that exhibit fast response times often exhibit underdamped transient responses that push the feedback signal above and below the thresholds, which determine the region of operation. If precautions are not taken, the control system toggles between the closed-loop and open-loop modes and therefore, is unstable. The under-damped response of the feedback signal can be substantially eliminated by lowering the forward loop gain, but the resultant response time might not be acceptable. Furthermore, slow response times can also produce mode toggling. If the initial transient, caused by a line resistance change, pushes the system into the feedback mode but, because of system mechanics, the signal momentarily drops back below this threshold and is not allowed to rise back fast enough, then the system could switch back into the open-loop mode.

In addition to transients created by on-hook/off-hook transitions, there are also transients accompanying battery supply changes. On-hook/off-hook transitions are usually followed by a system implemented switch to a different battery along with other corresponding operational changes.

These changes can create additional transients, which were accounted for. Thus, the complications associated with the switching between modes were overcome by the provision of a robust, digitally controlled mode-switching algorithm.

Although the present invention and its advantages have been described in detail, it should be understood that various changes, substitutions and alterations can be made herein without departing from the spirit and scope of the invention as defined by the appended claims.

What is claimed is:

1. A DC-feed controller for a current-feed subscriber line interface circuit, for controlling voltage on a telephone line, comprising a pair of wires, comprising:

a digital summer adapted to receive a predetermined voltage limit digital value as a first input, and to receive a negative digital feedback signal as a second input, and to provide as an output a digital error signal that represents the difference between the voltage limit digital value and the digital feedback signal;

a multiplier adapted to multiply the digital error signal by a predetermined digital gain value to provide a scaled digital error value as an output;

a digital integrator adapted to integrate the scaled digital error value over time to generate an integrated digital error signal having a first predetermined number n of significant bits;

a digital-to-analog converter adapted to receive a modified digital error signal comprising a second predetermined number m of bits, where m<n, of the integrated digital error signal as an input and to provide as an output an error analog signal that is representative of the modified digital error signal;

an analog-to-digital converter adapted to receive a sense signal as an input, the sense signal representing a sensed voltage on the telephone line, and adapted to provide as an output a digital sense signal that is a representation of the sense signal; and a first digital low pass filter adapted to receive the digital sense signal, and to provide the digital feedback signal as an output.

2. A DC-feed controller according to claim 1, further comprising:

an expander adapted to receive the integrated digital error signal as an input and to generate the modified digital error signal as an output, wherein the modified digital error signal varies in accordance with the resistance of the telephone line, the expander also being adapted to provide a gain control signal having a value that varies in accordance with the resistance of the telephone line; and a programmable gain amplifier adapted to receive the error analog signal as a signal input and to receive the gain control signal as a control input and to provide a DC-feed output signal to a first one of the wires.

3. A DC-feed controller according to claim 2, wherein the expander is adapted to generate the modified digital error signal by:

providing the integrated digital error signal as the modified digital error signal when the integrated digital error signal is less than a first predetermined transition value; and providing the integrated digital error signal, less a first adjustment value, as the modified digital error signal when the integrated digital error signal is greater than the first predetermined transition value.

4. A DC-feed controller according to claim 3, wherein the expander is adapted to generate the gain control signal by:

providing the gain control signal having a first gain value, when the integrated digital error signal is less than the first predetermined transition value; and providing the gain control signal having a second gain value, when the integrated digital error signal is greater than the first predetermined transition value.

5. A DC-feed controller according to claim 4, wherein the expander is adapted to generate the modified digital error signal by providing the integrated digital error signal, less a second adjustment value, as the modified digital error signal when the integrated digital error signal is greater than a second predetermined transition value.

6. A DC-feed controller according to claim 5, wherein the expander is adapted to generate the gain control signal by providing the gain control signal having a third gain value, when the integrated digital error signal is greater than the second predetermined transition value.

7. A DC-feed controller according to claim 1, further comprising a programmable gain amplifier adapted to receive the error analog signal as a signal input and to receive a programmable control signal as a control input and to provide a DC-feed output signal to a first one of the wires.

8. A DC-feed controller according to claim 1, further comprising a programmable gain amplifier adapted to receive an unmodified sense signal on the second one of the wires as a signal input, the sense signal representing a sensed voltage on the line, and adapted to provide as an output the sense signal, amplified by a programmable gain factor provided to the programmable gain amplifier.

9. A DC-feed controller according to claim 1, further comprising a dead zone function adapted to receive the scaled digital error value as an input and to provide a scaled digital error value of zero to the digital integrator when the absolute value of the scaled digital error value is less than a predetermined value.

10. A DC-feed controller according to claim 1, wherein the DC-feed controller is operable in selectable battery modes, a low battery mode and a high battery mode, further comprising:

a multiplexer for selecting between a low battery predetermined voltage limit digital value and a high battery predetermined voltage limit digital value, depending on a selected battery mode, for provision to the summer; and wherein the first digital low pass filter is provided as a low battery mode low pass filter, and a second digital low pass filter is provided as a high battery mode low pass filter adapted to receive the digital sense signal and to provide the digital feedback signal as an output, and said first digital low pass filter and said second digital low pass filter are selectable according to a selected battery mode.

11. A DC-feed controller according to claim 1, wherein the DC-feed controller is operable to select between an open loop mode and a closed loop mode, further comprising:

a multiplexer adapted to receive the integrated digital error value as a first input and an open loop digital current value as a second input; and a mode select function adapted to select between open loop mode and closed loop mode depending on the value of the digital sense signal, and to control the multiplexer to select between the integrated digital error value and the open loop digital current value as an output to the expander, depending on the selected mode.

12. A DC-feed controller according to claim 11, wherein the mode select function is programmable to select closed loop mode when the value of the digital sense signal is greater than a first programmable threshold value, and to prevent selection of open loop mode until the value of the digital sense signal goes below a second programmable threshold value which is smaller than the first threshold value.

13. A DC-feed controller according to claim 11, wherein the mode select function is programmable to select open loop mode only when the conditions for switching to open-loop mode exist without interruption for a programmable interval of time.

14. A DC-feed controller according to claim 13, further comprising a second low pass filter adapted to receive the digital sense signal as an input and to provide a filtered output to the mode select function.

15. A DC-feed controller according to claim 1, wherein the digital integrator is adapted to be provided with a programmable initial value.

16. A DC-feed controller according to claim 1, wherein the digital integrator is adapted to be provided with an initial value which is a value stored from a previous operation of the controller.

17. A DC-feed controller according to claim 1, wherein the first digital low pass filter is adapted to be provided with a programmable initial value.

18. A DC-feed controller according to claim 1, wherein the first digital low pass filter is adapted to be provided with a predetermined initial value.

19. A DC-feed controller according to claim 10, wherein the first digital low pass filter is adapted to be provided with a first programmable initial value, and wherein the second digital low pass filter is adapted to be provided with a second programmable initial value.

20. A DC-feed controller according to claim 10, wherein the first digital low pass filter is adapted to be provided with a first predetermined initial value, and wherein the second digital low pass filter is adapted to be provided with a second predetermined initial value.

21. A DC-feed controller for a voltage-feed subscriber line interface circuit, for controlling current on a telephone line comprising a pair of wires, comprising:

a digital summer adapted to receive a predetermined current limit digital value as a first input, and to receive a negative digital feedback signal as a second input, and to provide as an output a digital error signal that represents the difference between the current limit digital value and the digital feedback signal;

a multiplier adapted to multiply the digital error signal by a predetermined digital gain value to provide a scaled digital error value as an output;

a digital integrator adapted to integrate the scaled digital error value over time to generate an integrated digital error signal having a first predetermined number n of significant bits;

a first digital-to-analog converter adapted to receive a modified digital error signal comprising a second predetermined number m of bits, where m<n, of the integrated digital error signal as an input and to provide as an output a first error analog signal;

an analog-to-digital converter adapted to receive a first sense signal as an input, the sense signal representing a first sensed current on the telephone line, and adapted to provide as an output a digital sense signal that is a representation of the sense signal; and a first digital low pass filter adapted to receive the digital sense signal, and to provide the digital feedback signal as an output.

22. A DC-feed controller according to claim 21, further comprising:

an expander adapted to receive the integrated digital error signal as an input and to generate the modified digital error signal as an output, wherein the modified digital error signal varies in accordance with the resistance of the telephone line, the expander also being adapted to provide a gain control signal having a value that varies in accordance with the resistance of the telephone line; and a programmable gain amplifier adapted to receive the error analog signal as a signal input and to receive the gain control signal as a control input and to provide a DC-feed output signal to a first one of the wires.

23. A DC-feed controller according to claim 22, wherein the expander is adapted to generate the modified digital error signal by:

providing the integrated digital error signal as the modified digital error signal when the integrated digital error signal is less than a first predetermined transition value; and providing the integrated digital error signal, less a first adjustment value, as the modified digital error signal when the integrated digital error signal is greater than the first predetermined transition value.

24. A DC-feed controller according to claim 23, wherein the expander is adapted to generate the gain control signal by:

providing the gain control signal having a first gain value, when the integrated digital error signal is less than the first predetermined transition value; and providing the gain control signal having a second gain value, when the integrated digital error signal is greater than the first predetermined transition value.

25. A DC-feed controller according to claim 24, wherein the expander is adapted to generate the modified digital error signal by providing the integrated digital error signal, less a second adjustment value, as the modified digital error signal when the integrated digital error signal is greater than a second predetermined transition value.

26. A DC-feed controller according to claim 25, wherein the expander is adapted to generate the gain control signal by providing the gain control signal having a third gain value, when the integrated digital error signal is greater than the second predetermined transition value.

27. A DC-feed controller according to claim 21, further comprising a programmable gain amplifier adapted to receive the error analog signal as a signal input and to receive a programmable control signal as a control input and to provide a DC-feed output signal to a first one of the wires.

28. A DC-feed controller according to claim 21, further comprising a programmable gain amplifier adapted to receive an unmodified sense signal on the second one of the wires as a signal input, the sense signal representing a sensed current on the line, and adapted to provide as an output the sense signal, amplified by a programmable gain factor provided to the programmable gain amplifier.

29. A DC-feed controller according to claim 21, further comprising a dead zone function adapted to receive the scaled digital error value as an input and to provide a scaled digital error value of zero to the digital integrator when the absolute value of the scaled digital error value is less than a predetermined value.

30. A DC-feed controller according to claim 21, wherein the DC-feed controller is operable in selectable battery modes, a low battery mode and a high battery mode, further comprising:
  a multiplexer for selecting between a low battery predetermined current limit digital value and a high battery predetermined current limit digital value, depending on a selected battery mode, for provision to the summer; and
  wherein the first digital low pass filter is provided as a low battery mode low pass filter, and a second digital low pass filter is provided as a high battery mode low pass filter adapted to receive the digital sense signal and to provide the digital feedback signal as an output, and said first digital low pass filter and said second digital low pass filter are selectable according to a selected battery mode.

31. A DC-feed controller according to claim 21, wherein the DC-feed controller is operable to select between an open loop mode and a closed loop mode, further comprising:
  a multiplexer adapted to receive the integrated digital error value as a first input and an open loop digital voltage value as a second input; and
  a mode select function adapted to select between open loop mode and closed loop mode depending on the value of the digital sense signal, and to control the multiplexer to select between the integrated digital error value and the open loop digital voltage value as an output to the expander, depending on the selected mode.

32. A DC-feed controller according to claim 31, wherein the mode select function is programmable to select closed loop mode when the value of the digital sense signal is greater than a first programmable threshold value, and to prevent selection of open loop mode until the value of the digital sense signal goes below a second programmable threshold value which is smaller than the first threshold value.

33. A DC-feed controller according to claim 31, wherein the mode select function is programmable to select open loop mode only when the conditions for switching to open-loop mode exist without interruption for a programmable interval of time.

34. A DC-feed controller according to claim 33, further comprising a second low pass filter adapted to receive the digital sense signal as an input and to provide a filtered output to the mode select function.

35. A DC-feed controller according to claim 21, wherein the digital integrator is adapted to be provided with a programmable initial value.

36. A DC-feed controller according to claim 21, wherein the digital integrator is adapted to be provided with an initial value which is a value stored from a previous operation of the controller.

37. A DC-feed controller according to claim 21, wherein the first digital low pass filter is adapted to be provided with a programmable initial value.

38. A DC-feed controller according to claim 1, wherein the first digital low pass filter is adapted to be provided with a predetermined initial value.

39. A DC-feed controller according to claim 30, wherein the first digital low pass filter is adapted to be provided with a first programmable initial value, and wherein the second digital low pass filter is adapted to be provided with a second programmable initial value.

40. A DC-feed controller according to claim 30, wherein the first digital low pass filter is adapted to be provided with a first predetermined initial value, and wherein the second digital low pass filter is adapted to be provided with a second predetermined initial value.

41. A DC-feed controller according to claim 21, further comprising a second digital-to-analog converter adapted to receive the modified digital error signal and to provide as an output a second error analog signal, wherein the first and second error analog signals are controllable to vary symmetrically around a programmable value.

42. A DC-feed controller according to claim 21, further comprising:
  a second analog-to-digital converter adapted to receive a second sense signal, the second sense signal representing a sensed current on the telephone line; and
  an averaging function for providing the digital sense signal as an average of the first and second sense signals.

43. In a DC-feed controller, a method for controlling a control voltage to a current-feed subscriber line interface circuit controlling voltage on a telephone line, comprising the steps of:
  receiving a predetermined voltage limit digital value, and receiving a negative digital feedback signal, and providing a digital error signal that represents the difference between the voltage limit digital value and the digital feedback signal;
  multiplying the digital error signal by a predetermined digital gain value to provide a scaled digital error value;
  integrating the scaled digital error value over time to generate an integrated digital error signal having a first predetermined number n of significant bits;
  receiving a modified digital error signal comprising a second predetermined number m of bits, where m<n, of the integrated digital error signal and providing an analog error signal that is representative of the modified digital error signal and that comprises the control voltage;
  receiving a sense signal as an input, the sense signal representing a sensed voltage on the telephone line, and providing a digital sense signal that is a representation of the sense signal; and
  digitally low pass filtering the digital sense signal to provide the digital feedback signal.

44. In a DC-feed controller, a method for controlling a control voltage to a voltage-feed subscriber line interface circuit controlling voltage on a telephone line, comprising the steps of:
  receiving a predetermined current limit digital value, and receiving a negative digital feedback signal, and providing a digital error signal that represents the difference between the current limit digital value and the digital feedback signal;
  multiplying the digital error signal by a predetermined digital gain value to provide a scaled digital error value;
  integrating the scaled digital error value over time to generate an integrated digital error signal having a first predetermined number n of significant bits;
  receiving a modified digital error signal comprising a second predetermined number m of bits, where m<n, of the integrated digital error signal as an input and providing a first analog error signal;
  receiving a first sense signal as an input, the sense signal representing a first sensed current on the telephone line, and providing as an output a digital sense signal that is a representation of the sense signal and that comprises the control voltage; and digitally low pass filtering the digital sense signal to provide the digital feedback signal.

45. A DC-feed controller programmably usable to control a current-feed subscriber line interface circuit ("SLIC") and a voltage-feed SLIC, for programmably controlling voltage and current, on a telephone line, comprising a pair of wires, comprising:

- a digital summer adapted to receive a predetermined voltage limit digital value as a first input in a first programming mode, and adapted to receive a predetermined current limit digital value in a second programming mode, and to receive a negative digital feedback signal as a second input, and to provide as an output a digital error signal that represents the difference between the voltage limit digital value and the digital feedback signal in the first programming mode, and that represents the difference between the current limit digital value and the digital feedback signal in the second programming mode;
- a multiplier adapted to multiply the digital error signal by a predetermined digital gain value to provide a scaled digital error value as an output;
- a digital integrator adapted to integrate the scaled digital error value over time to generate an integrated digital error signal having a first predetermined number n of significant bits;
- a digital-to-analog converter adapted to receive a modified digital error signal comprising a second predetermined number m of bits, where m<n, of the integrated digital error signal as an input and to provide as an output an error analog signal that is representative of the modified digital error signal;
- an analog-to-digital converter adapted to receive a sense signal as an input, the sense signal representing a sensed voltage on the telephone line in the first programming mode, and representing a sensed current on the telephone line in the second programming mode, and adapted to provide as an output a digital sense signal that is a representation of the sense signal; and
- a first digital low pass filter adapted to receive the digital sense signal, and to provide the digital feedback signal as an output.

* * * * *